3,474,173
PROCESSES OF USING SULFONATE SALTS AS BIRD REPELLENTS

Andrew J. Reinert, Jennings P. Blackwell, and Kenneth E. Cantrel, Bartlesville, Okla., assignors to Phillips Petroleum Company, a corporation of Delaware
No Drawing. Filed Dec. 22, 1967, Ser. No. 692,718
Int. Cl. A01n 9/14
U.S. Cl. 424—315                                         2 Claims

ABSTRACT OF THE DISCLOSURE

Compositions comprising sulfonate salts are found to be repellent to birds. By spreading these compositions on a locus such as the normal roosting places, the birds are repelled therefrom.

FIELD OF THE INVENTION

This invention relates to animal repellents.

DESCRIPTION OF THE PRIOR ART

The closest known prior art is U.S. Patent 3,055,803 patented Sept. 25, 1962, by Goodhue et al., where certain diyne diols are employed in the same manner as the present materials as bird repellents. This patent is classified on its face as in Class 167, Subclass 46. The present invention substitutes sulfonate salts for the diyne diols of the prior art, which is an unexpected substitution, as the chemicals substituted were not known to be equivalent to those replaced by them. It is patentable invention to enlarge the field of chemicals useful as bird repellents.

SUMMARY OF THE INVENTION

Certain birds, especially starlings, are a great nuisance especially in large cities where they roost in a locus such as on ledges on buildings in large numbers. The expense in cleaning the buildings runs into thousands of dollars a year in each city and the appearance of the buildings is quite bad, along with the danger to people passing by as to contamination by and possible sickness contracted from the bird droppings.

Compositions comprising sulfonate salts are found to be repellent to birds. By spreading these compositions on normal roosting places, the birds are repelled therefrom and may leave the neighborhood.

One object of the present invention is to repel birds from desired treated loci, or normal roosting places.

Another object is to provide processes for repelling birds.

Numerous other objects, advantages and features of the present invention will be obvious to those skilled in the art upon reading the following description and claims.

DESCRIPTION OF PREFERRED EMBODIMENTS

This invention relates to bird repellents, and especially to a method for discouraging birds from resting on a particular surface.

In accordance with this invention, birds are discouraged from resting on a particular surface by applying to said surface an alkali metal salt or an alkaline earth metal salt of a sulfonic acid having the formula $RSO_3H$, where R is a radical selected from the group consisting of alkyl, cycloalkyl, alkylcycloalkyl and cycloalkylalkyl, said radical preferably having about 4 to 24 carbon atoms.

The bird repellents of this invention can be applied to a particular surface as the pure substances or in combination with a carrier or inert material. For example, the repellents can be applied in the form of a solution or emulsion in a solvent or carrier such as water, acetone, alcohol, dimethyl sulfoxide, kerosene, hydrocarbons which boil between about 260 to 800° F., and the like. If desired, emulsifying or wetting agents can be present. The repellents can also be applied as dusts, using solid carriers such as kieselguhr, talc, silica gel, molecular sieves, diatomaceous earth, and the like. In addition, the repellents can be applied in conjunction with an adhesive to the surface from which birds are to be repelled. Suitable adhesives include latex, gelatin, methyl cellulose, polyisobutylene and petrolatum. These repellents can also be used in solvents and fed to the locus through a suitable porous wick of cotton or the like.

The bird repellents of this invention can be applied in any convenient manner, such as by spraying, brushing, dusting, etc.

The bird repellents of this invention are applied to surfaces from which birds are to be repelled in a manner so as to deposit an amount preferably within the range of about 0.01 to 10 grams of the active repellent substance per square foot of surface treated. Larger amounts of the repellent, of course, can be used.

Example I

The repellency of a sulfonate salt-containing composition was tested by the standard two-roost test. In this test a cage 32 inches wide, 36 inches high and 72 inches long was provided with two perches across its width, each perch 32 inches long and 12 inches from the adjacent end. Roosting on the floor was discouraged by flooding the floor with water. Exhaust hoods were placed above each perch and were actuated by fans to draw off any vapors so they could not be deleterious to the other perch. Four live and healthy starlings were placed in each cage and observed through a peephole in an adjacent screen (which prevented the birds from seeing the observer) after 60, 75, 90, 105 and 120 minutes had elapsed. Without repellents there should be two birds on each perch, which multiplied by the number of five observations should be a score of 10 for each perch. A score of 4 or less on the treated perch is considered to demonstrate some repellency, and a score of 3 or less on the treatd perch is considered to show sufficient repellency to be an excellent repellent. Barium cyclohexanesulfonate, having the formula

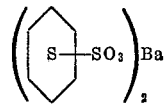

was even better than 3 with an average score of 1.8 on the treated perch in four tests of five observations each. In contrast, the following materials had no repellency at all, having scores of average values between 9 and 11:

3-dimethylaminopropyl dithiocarbamic acid.
Acetyl-β-methyl choline chloride.
Dimaleic anhydride condensate of cyclopentadiene.
Adipic acid dihydrazide.

In each of the above tests, 2 grams of the chemical tested was applied evenly to the perch that was observed through the peephole. A score of from 9 to 11 indicates substantially no repellency whatsoever, as the birds are free to move where they please at all times throughout the test.

Example II

The test described in Example I is repeated using about 0.01 to 10 grams per square foot of the treated perch of the following alkali metal salts and alkaline earth metal salts of sulfonic acids and mixtures thereof as the active ingredient and repellency is noted. When 5 grams or more of these active ingredients are used on the treated perch, the score on the treated perch in five observations will be found to be 3 or less.

These active ingredients effective as bird repellents in Example II for the practice of this invention include lithium 1-butanesulfonate, sodium 3-hexanesulfonate, potassium 3-ethyl-2-octanesulfonate, rubidium 4-octadecanesulfonate, cesium 1 - tetracosanesulfonate, berryllium 2-methyl - 2 - propanesulfonate, magnesium 2-pentanesulfonate, calcium 1- heptanesulfonate, strontium 4 - dodecanesulfonate, barium 2 - ethyl - 3 - tetradecanesulfonate, radium 5 - tetracosanesulfonate, barium 2 - hexadecanesulfonate, lithium cyclobutanesulfonate, sodium cyclohexanesulfonate, potassium cyclododecanesulfonate, magnesium cyclopentanesulfonate, barium cyclohexanesulfonate, calcium cyclooctanesulfonate, strontium cyclodecanesulfonate, sodium 2 - methylcyclopentanesulfonate, potassium 3 - ethylcyclooctanesulfonate, calcium 4 - methylcyclohexanesulfonate, barium 1 - ethylcyclodecanesulfonate, lithium cyclopentylmethanesulfonate, sodium 2 - cyclooctylethanesulfonate, magnesium 4 - cyclohexyl - 1-butanesulfonate, barium 2 - cyclododecylethanesulfonate, and the like.

In producing an effective bird repellent composition from 1 to 99 percent and preferably 1 to 25 percent by weight of the active ingredient can be employed with the remainder of the composition comprising the selected carrier. The carrier, as stated in the third to fifth paragraphs under the subtitle "Description of Preferred Embodiments" above, is selected from the group consisting of water, acetone, alcohol, dimethyl sulfoxide, kerosene, hydrocarbons boiling between 260 and 800° F., latex, gelatin, methyl cellulose, polyisobutylene, petrolatum, kieselguhr, talc, silica gel, molecular sieves, and diatomaceous earth. All such compositions are effective as bird repellents in Example II for the practice of this invention.

Having described our invention, we claim:

1. A method of repelling birds from a building surface which comprises depositing on the surface of the building from which the birds are to be repelled a repellent amount of an active ingredient selected from the group consisting of an alkali metal salt and an alkaline earth metal salt of a sulfonic acid having the formula $RSO_3H$, where R is a radical selected from the group consisting of alkyl, cycloalkyl, alkylcycloalkyl, and cycloalkylalkyl, said radical having 4 to 24 carbon atoms.

2. The method of claim 1 in which the active ingredient is barium cyclohexanesulfonate, having the formula

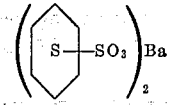

References Cited

UNITED STATES PATENTS 2,337,552   12/1943   Henke _____ 252—161
3,267,040   8/1966   Bright _____ 252—161

ALBERT T. MEYERS, Primary Examiner

V. D. TURNER, Assistant Examiner